(12) United States Patent
Yanaze et al.

(10) Patent No.: US 10,663,030 B2
(45) Date of Patent: May 26, 2020

(54) HYBRID VEHICLE

(71) Applicant: TOYOTA JIDOSHA KABUSHIKI KAISHA, Toyota-shi, Aichi-ken (JP)

(72) Inventors: Takahiro Yanaze, Toyota (JP); Shinya Asaura, Toyota (JP); Ryota Momose, Toyota (JP); Shingo Satake, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/369,726

(22) Filed: Mar. 29, 2019

(65) Prior Publication Data

US 2019/0309822 A1 Oct. 10, 2019

(30) Foreign Application Priority Data

Apr. 9, 2018 (JP) .................................. 2018-074559

(51) Int. Cl.
*B60K 6/20* (2007.10)
*F16F 15/123* (2006.01)
*F16F 15/129* (2006.01)

(52) U.S. Cl.
CPC ...... *F16F 15/12353* (2013.01); *F16F 15/129* (2013.01); *B60Y 2200/92* (2013.01)

(58) Field of Classification Search
CPC .... F16F 15/12353; F16F 15/129; F16F 15/00; F16F 15/121; F16F 15/10; B60K 6/00; B60K 6/20; B60K 6/22; B60K 6/26; B60K 6/36; B60K 6/40; B60K 6/50; F16D 3/12; F16D 13/68; F16D 13/70; F16D 65/0018; F16D 2300/22; F16D 2500/50293
See application file for complete search history.

(56) References Cited

U.S. PATENT DOCUMENTS

| | | | | |
|---|---|---|---|---|
| 5,979,623 A * | 11/1999 | Yamamoto | .......... | F16F 15/1442 192/30 V |
| 7,159,703 B2 * | 1/2007 | Fukushima | ....... | F16F 15/13178 192/214.1 |
| 8,240,441 B2 * | 8/2012 | Heeke | ...................... | B60K 6/40 192/3.25 |
| 8,360,928 B2 * | 1/2013 | Tabata | ................... | B60K 6/365 477/4 |
| 8,405,335 B2 * | 3/2013 | Yoshida | ................. | B60K 6/445 318/432 |
| 9,020,673 B2 * | 4/2015 | Yamamoto | ............. | B60K 6/445 701/22 |

(Continued)

FOREIGN PATENT DOCUMENTS

JP 2014-144684 A 8/2014
JP 2015-163021 A 9/2015

*Primary Examiner* — James M Dolak
(74) *Attorney, Agent, or Firm* — Oliff PLC

(57) ABSTRACT

A hybrid vehicle includes: an engine; a transmission; a power transmission path provided between the engine and the transmission; dampers provided in the power transmission path; and a motor, provided between the dampers, the motor including a rotor, a mass body, an elastic member, and a hysteresis mechanism, the elastic member, and a hysteresis mechanism being arranged in parallel between the rotor and the mass body. Further, the hysteresis mechanism applies a frictional force in a direction opposite to a vibration direction of the mass body to the mass body when the mass body vibrates.

1 Claim, 3 Drawing Sheets

(56) References Cited

U.S. PATENT DOCUMENTS

| | | | | |
|---|---|---|---|---|
| 9,216,733 B2* | 12/2015 | Gotoda | ................ | B60W 20/10 |
| 9,784,336 B2* | 10/2017 | Sugiyama | ............. | F16F 15/139 |
| 9,933,039 B2* | 4/2018 | Werner | ................ | B60W 10/08 |
| 10,138,978 B2* | 11/2018 | Sugiyama | ............ | F16F 15/1297 |
| 10,288,144 B2* | 5/2019 | Durham | .................. | F16H 45/02 |
| 10,323,716 B2* | 6/2019 | Yoshikawa | ........ | F16F 15/12366 |
| 10,359,082 B2* | 7/2019 | Malley | .................. | F16D 13/686 |
| 10,487,909 B2* | 11/2019 | Yoshikawa | .......... | F16F 15/1206 |
| 10,570,986 B2* | 2/2020 | Lebas | ............... | F16F 15/12353 |

* cited by examiner

HYBRID VEHICLE

CROSS-REFERENCE TO RELATED APPLICATION(S)

The present application claims priority to and incorporates by reference the entire contents of Japanese Patent Application No. 2018-074559 filed in Japan on Apr. 9, 2018.

BACKGROUND

The present disclosure relates to a hybrid vehicle.

Japanese Laid-open Patent Publication No. 2014-144684 discloses a hybrid vehicle in which a motor is arranged in a power transmission path between an engine and a transmission via a damper, a so-called one-motor hybrid vehicle (1M-HV).

In the one-motor hybrid vehicle, typically, there exist three resonance points due to its structure, and there exists a frequency range (engine speed range) where anti-resonance occurs due to an effect of rotational inertia of the motor. In the frequency range where the anti-resonance occurs, a fluctuation level of the engine speed decreases. For this reason, it is difficult to detect a misfire on the basis of the fluctuation level of the engine speed in the frequency range where the anti-resonance occurs.

SUMMARY

There is a need for providing a hybrid vehicle capable of accurately detecting an occurrence of a misfire even in a frequency range where the anti-resonance occurs.

According to an embodiment, a hybrid vehicle includes: an engine; a transmission; a power transmission path provided between the engine and the transmission; dampers provided in the power transmission path; and a motor, provided between the dampers, the motor including a rotor, a mass body, an elastic member, and a hysteresis mechanism, the elastic member and the hysteresis mechanism being arranged in parallel between the rotor and the mass body. Further, the hysteresis mechanism applies a frictional force in a direction opposite to a vibration direction of the mass body to the mass body when the mass body vibrates

DETAILED DESCRIPTION

An example configuration of a hybrid vehicle according to an embodiment of the present disclosure is hereinafter described with reference to the accompanied drawings.

Figure 1:
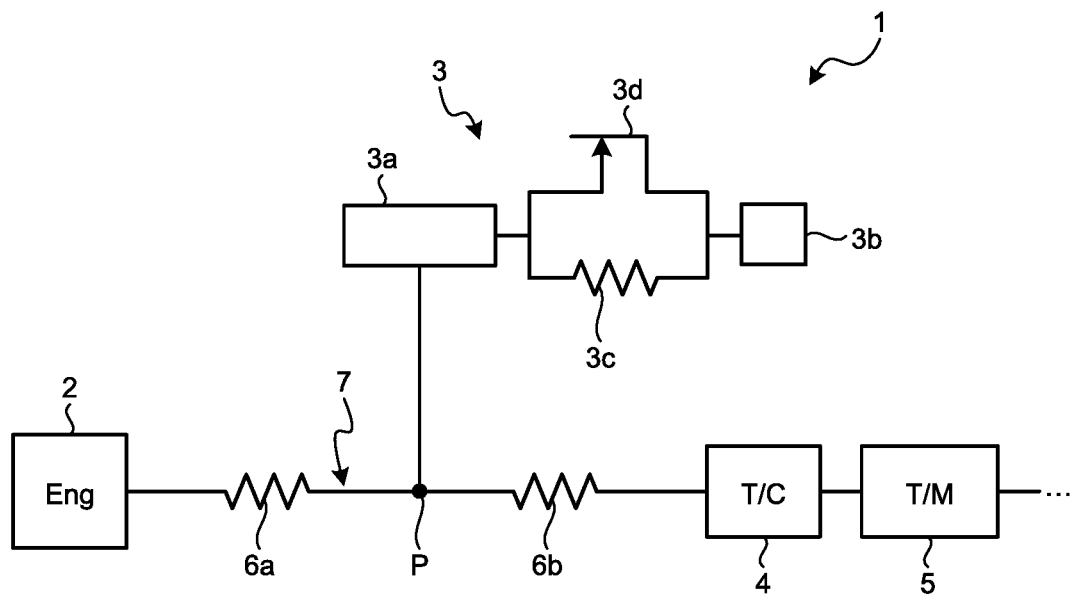
FIG. 1 is a diagram schematically illustrating an example configuration of a hybrid vehicle according to an embodiment of the present disclosure.

FIG. 1 is a diagram schematically illustrating the example configuration of the hybrid vehicle according to the embodiment of the present disclosure. As illustrated in FIG. 1, a hybrid vehicle 1 according to the embodiment of the present disclosure is a one-motor hybrid vehicle and includes an engine (Eng) 2, a motor 3, a torque converter (T/C) 4, a transmission (T/M) 5, and dampers 6a and 6b as main components.

The engine 2 is an internal combustion engine which outputs power using gasoline, light oil or the like as a fuel.

The motor 3 is a synchronous motor generator, and a rotor 3a thereof is connected to a position P on a power transmission path between the damper 6a and the damper 6b.

The torque converter 4 transmits a torque output from the engine 2 and the motor 3 to an input shaft of the transmission 5.

The transmission 5 changes a speed of an output torque from the torque converter 4 and then transmits the same to driving wheels (not illustrated).

The dampers 6a and 6b are disposed in series on the power transmission path between the engine 2 and the torque converter 4. The dampers 6a and 6b are, for example, spring dampers, and suppress torsional vibration which is caused by a torque fluctuation and a vibration.

In the hybrid vehicle 1 having such a configuration, there is a frequency range where an anti-resonance occurs due to an effect of a rotational inertia of the motor 3, and a fluctuation level of an engine speed decreases in the frequency range where the anti-resonance occurs. For this reason, it is difficult to detect an occurrence of a misfire on the basis of the fluctuation level of the engine speed in the frequency range where the anti-resonance occurs. Therefore, in this embodiment, by configuring the motor 3 as described below, an occurrence level of the anti-resonance caused by the effect of the rotational inertia of the motor 3 is controlled so as to maintain the fluctuation level of the engine speed to the fluctuation level capable of detecting the occurrence of the misfire. Hereinafter, a detailed configuration of the motor 3 is described.

As illustrated in FIG. 1, in the motor 3 according to the embodiment, a mass body 3b is connected to a rotor 3a of the motor 3 via an elastic member 3c and a hysteresis mechanism 3d, which are arranged in parallel. When the mass body 3b vibrates, the hysteresis mechanism 3d applies a frictional force, which is in a direction opposite to the vibration direction, to the mass body 3b. According to such a configuration, when the vibration force due to the vibration of the motor 3 exceeds the frictional force, the mass body 3b vibrates according to the rigidity, but the vibration cycle has a phase difference with respect to an anti-resonance point. As a result, although the anti-resonance typically occurs at a frequency which has nodes at two natural frequencies, the nodes do not coincide due to the above-described phase difference, so that the vibration level of the motor 3 reduced by the anti-resonance may be reduced.

Figure 2:
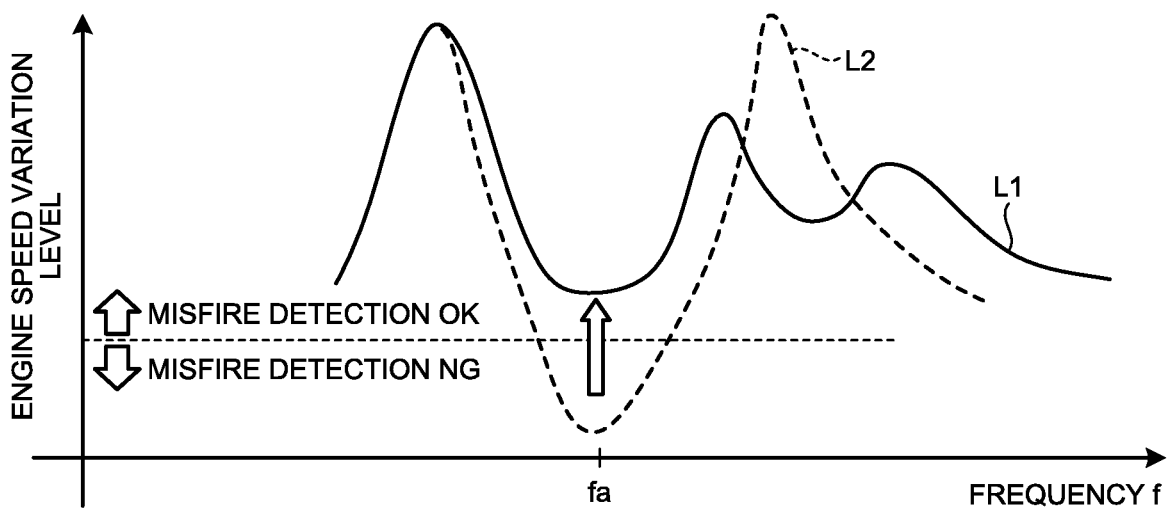
FIG. 2 is a graph schematically illustrating an engine speed fluctuation level in a related-art hybrid vehicle and a hybrid vehicle according to the embodiment of the present disclosure.

As a result, as indicated by a curve L2 in FIG. 2, in resonance characteristics of a related-art structure, in which no such hysteresis mechanism 3d is provided, the fluctuation level of the engine speed decreases to a level at which it is difficult to detect an occurrence of a misfire (misfire detection NG) at an anti-resonance frequency fa. On the other hand, as indicated by a curve L1 in FIG. 2, in resonance characteristics of the present disclosure provided with the hysteresis mechanism 3d, the fluctuation level of the engine speed may be maintained at the fluctuation level at which an occurrence of a misfire can be detected (misfire detection OK) at the anti-resonance frequency fa. Therefore, the occurrence of the misfire can be accurately detected even in the frequency range where the anti-resonance occurs.

Example

Figure 3:
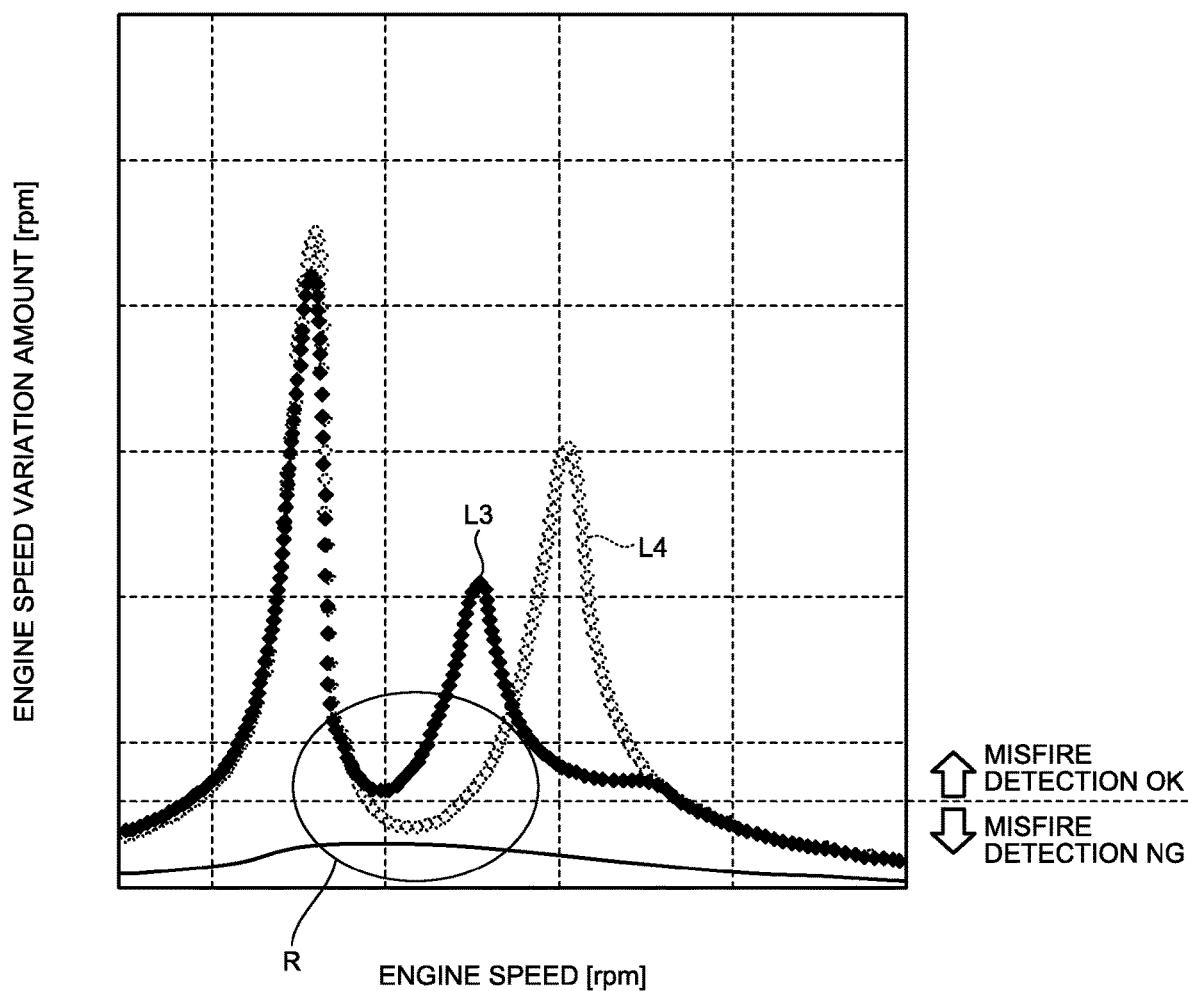
FIG. 3 is a graph illustrating an evaluation result of a change in engine speed fluctuation amount according to a change in engine speed.
Figure 4:
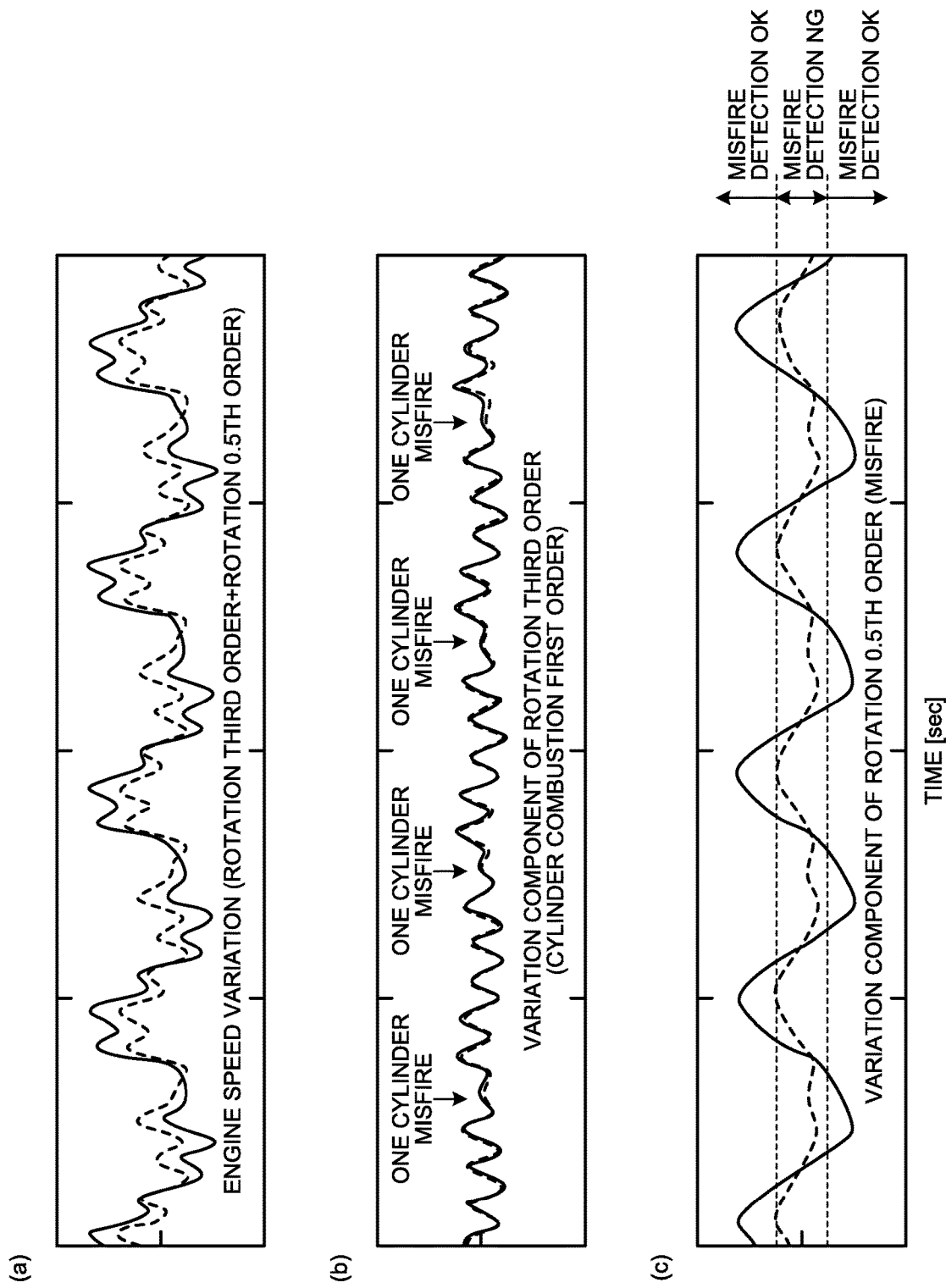
FIG. 4 is a view illustrating evaluation results of a change in time of the engine speed fluctuation amount.

According to the embodiment, a change in engine speed fluctuation amount due to the change in engine speed and a change in time of the engine speed fluctuation amount were evaluated regarding the resonance characteristics of both the related-art structure and the present disclosure. FIG. 3 is a graph illustrating an evaluation result of the change in engine speed fluctuation amount according to a change in engine speed. Part (a) to (c) of FIG. 4 are graphs illustrating evaluation results of the change in time of the engine speed fluctuation amount. In FIG. 3, a curve L3 indicates the engine speed fluctuation amount in the resonance characteristics according to an embodiment of the present disclosure, and a curve L4 indicates the engine speed fluctuation amount in the resonance characteristics of the related-art structure. In part (a) to (c) of FIG. 4, solid lines indicate the engine speed fluctuation amounts in the resonance characteristics according to the present disclosure, and broken lines indicate the engine speed fluctuation amounts in the resonance characteristics of the related-art structure.

As illustrated in FIG. 3, according to the resonance characteristics in the present disclosure, it was confirmed that the fluctuation level of the engine speed can be maintained at the fluctuation level at which an occurrence of a misfire can be detected (misfire detection OK) in an engine speed region R in which the anti-resonance occurs. Further, as illustrated in part (a) to (c) of FIG. 4, according to the resonance characteristics of the present disclosure, it was confirmed that a level of a fluctuation component of rotation 0.5th order of the engine speed related to the misfire can be maintained at the fluctuation level at which the occurrence of the misfire can be detected (misfire detection OK) without changing the fluctuation component of rotation third order of the engine speed. As a result, it was confirmed that an occurrence of a misfire can be accurately detected even in the frequency range where the anti-resonance occurs according to the resonance characteristics in the present disclosure.

According to a hybrid vehicle according to the present disclosure, since an occurrence level of anti-resonance caused by an influence of a rotational inertia of a motor is controlled so as to maintain a fluctuation level of an engine speed at a fluctuation level at which an occurrence of a misfire can be detected, the occurrence of the misfire can be accurately detected even in a frequency range where the anti-resonance occurs.

Although the disclosure has been described with respect to a specific embodiment for a complete and clear disclosure, the appended claim is not to be thus limited but are to be construed as embodying all modifications and alternative constructions that may occur to one skilled in the art that fairly fall within the basic teaching herein set forth.

What is claimed is:
1. A hybrid vehicle comprising:
an engine;
a transmission;
a power transmission path provided between the engine and the transmission;
dampers provided in the power transmission path; and
a motor connected to a position on the power transmission path between the dampers, the motor including:
a rotor connected to the power transmission path;
a mass body separated from the power transmission path;
an elastic member; and
a hysteresis mechanism, the elastic member and the hysteresis mechanism being connected in parallel between the rotor and the mass body, the hysteresis mechanism for applying a frictional force to the mass body in a direction opposite to a vibration direction of the mass body when the mass body vibrates.

* * * * *